United States Patent [19]

Tomita et al.

[11] Patent Number: 5,452,741
[45] Date of Patent: Sep. 26, 1995

[54] PRESSURE REDUCING VALVE

[75] Inventors: Taku Tomita; Katsuaki Takahashi, both of Ibaraki, Japan

[73] Assignee: SMC Kabushiki Kaisha, Tokyo, Japan

[21] Appl. No.: 304,881

[22] Filed: Sep. 13, 1994

[30] Foreign Application Priority Data

Oct. 1, 1993 [JP] Japan ................. 5-053451 U
Dec. 28, 1993 [JP] Japan ................. 5-074918 U

[51] Int. Cl.$^6$ ............................ F16K 27/00; G05D 16/06
[52] U.S. Cl. .................. 137/505.26; 137/116.5; 137/505; 251/337
[58] Field of Search ................. 137/505, 116.5, 137/505.37, 505.38, 505.41, 505.42, 505.14, 505.26; 251/337, 60

[56] References Cited

U.S. PATENT DOCUMENTS

| | | | |
|---|---|---|---|
| 3,068,883 | 12/1962 | Brumm | 137/116.5 |
| 4,696,320 | 9/1987 | Bull | 137/505 X |
| 4,741,359 | 5/1988 | Siebald | 137/505.42 |
| 5,261,447 | 11/1993 | Boticki | 137/505.37 |

FOREIGN PATENT DOCUMENTS

090499  9/1987  Taiwan, Prov. of China.

*Primary Examiner*—Stephen M. Hepperle
*Attorney, Agent, or Firm*—Oblon, Spivak, McClelland, Maier & Neustadt

[57] ABSTRACT

A pressure reducing valve includes a first screw member on which a nut for adjusting the spring force of a pressure regulating spring travels, and a second screw member screwed into the first screw member and provided with a stopper for limiting the travel range of the nut at the tip. The second screw member can be displaced with respect to the first screw member along its length, so that the limiting range of the stopper against the travelling nut is adjustable.

7 Claims, 7 Drawing Sheets

PRESSURE REDUCING VALVE

BACKGROUND OF THE INVENTION

1. Field of the Invention

The present invention relates to a pressure reducing valve, in which the maximum outlet pressure can be safely set.

2. Description of the Related Art

Generally, when a pressurized fluid is supplied from a fluid pressure source to a fluid pressure apparatus at a desired pressure, a pressure reducing valve is interposed therebetween. The pressure reducing valve reduces the primary pressure of the fluid pressure source into a downstream pressure as desired by the fluid pressure apparatus connected thereto.

Figure 1:
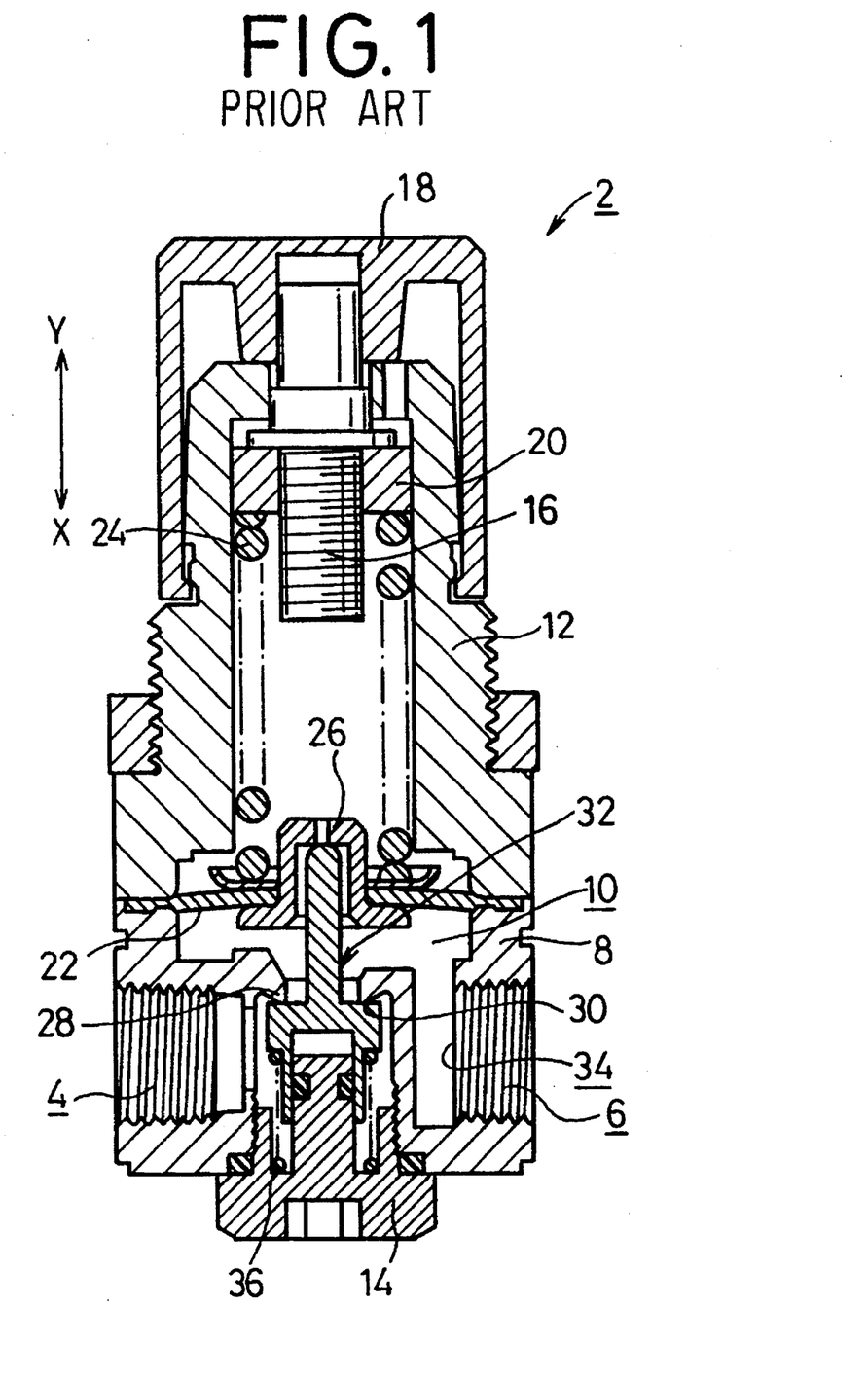
FIG. 1 is a vertical cross-sectional view showing a conventional pressure reducing valve.

FIG. 1 shows a conventional pressure reducing valve, which basically includes a valve seat 30 and a valve disk 32 in a body 8 in which a inlet port 4 and an outlet port 6 are defined. The valve disk 32 is urged upwardly to the valve seat 30 by a valve spring 36. When the valve disk 32 is forced to move downwardly, the fluid flows from the inlet port 4 into the outlet port 6, through a gap formed between the valve disk 32 and seat 30.

The upper portion of the valve disk 32 is normally pressed downwardly by a spring 24, via a diaphragm 22. A downward force of the spring 24 can be adjusted by a nut 20 which is displaceable in the directions shown by arrows X-Y, by rotating a screw member 16 fixed to a knob 18. The fluid pressure in the outlet port 6 is determined so that an upward force exerted by the fluid pressure in the outlet port 6 onto the diaphragm 22 is brought to a balance against the downward force of the spring 24.

In the conventional pressure reducing valve shown in FIG. 1, however, there arises a danger of over-pressing the spring 24, until the windings of the spring come to contact with each other remaining a zero winding pitch, since the displacement of the nut 20 is not posed any limit. When over-pressed, the spring 24 cannot be pushed back by the diaphragm 22, and the valve disk 32 is kept apart from the valve seat 30 at a position in the direction shown by the arrow X. As a result, there has been a problem that the primary pressure of the fluid pressure source without being reduced is applied to the fluid pressure apparatus connected downstream the pressure reducing valve and damage it.

To cope with this problem, a stopper for the nut 20 may be provided at the end of the screw member 16. However, with such a fixed stopper, the maximum set pressure of the pressure reducing valve is fixed at a value that would make it difficult to adapt to the operating pressure range of the downstream fluid pressure apparatus.

Besides, the maximum set pressure determined by the fixed stopper may be affected by dimensional errors of components, an error in the spring modulus, etc, of the pressure reducing valve, which cause the maximum set pressure to deviate from a target pressure.

SUMMARY OF THE INVENTION

Therefore, an object of the present invention is to provide a pressure reducing valve in which the movable range of a stopper which determines a maximum set pressure is made changeable, to thereby make it possible to select the maximum set pressure of the pressure reducing valve within the operating pressure range of a fluid pressure apparatus to be connected downstream of the valve to guard it from a damaging high pressure.

Another object of the present invention is to provide a pressure reducing valve in which the difference between a target maximum set pressure and an actual maximum set pressure of the pressure reducing valve is kept as small as possible.

The above-stated objects can be achieved with a pressure reducing valve having a spring for setting an outlet pressure, and a knob for setting the outlet pressure by adjusting the spring force of the spring, which comprises: a first screw member secured to the knob to be rotated by the knob; a nut mounted on the first screw member for adjusting the spring force of the spring by the displacement of the nut along the first screw member produced by the rotation of the first screw member; a second screw member screwed into a threaded hole defined in the first screw member along the central axis thereof; and a stopper provided at the tip of the second screw member for limiting the maximum displacement of the nut along the first screw member.

With the arrangement described above, since the movable range of the stopper which determines a maximum set pressure can be changed by displacing the second screw member with respect to the first screw member, it becomes possible to select the maximum set pressure of the pressure reducing valve within the operating pressure range of a fluid pressure apparatus to be connected downstream the valve to guard it from a damaging high pressure. Further, since the position of the stopper is adjustable, the difference between the target maximum set pressure and an actual maximum set pressure of the pressure reducing valve can be substantially eliminated.

BRIEF DESCRIPTION OF THE DRAWINGS

Other objects and advantages of the present invention will become more apparent from embodiments which shall be explained in detail hereinafter with reference to attached drawings, wherein.

DETAILED DESCRIPTION OF THE PREFERRED EMBODIMENTS

Figure 2:
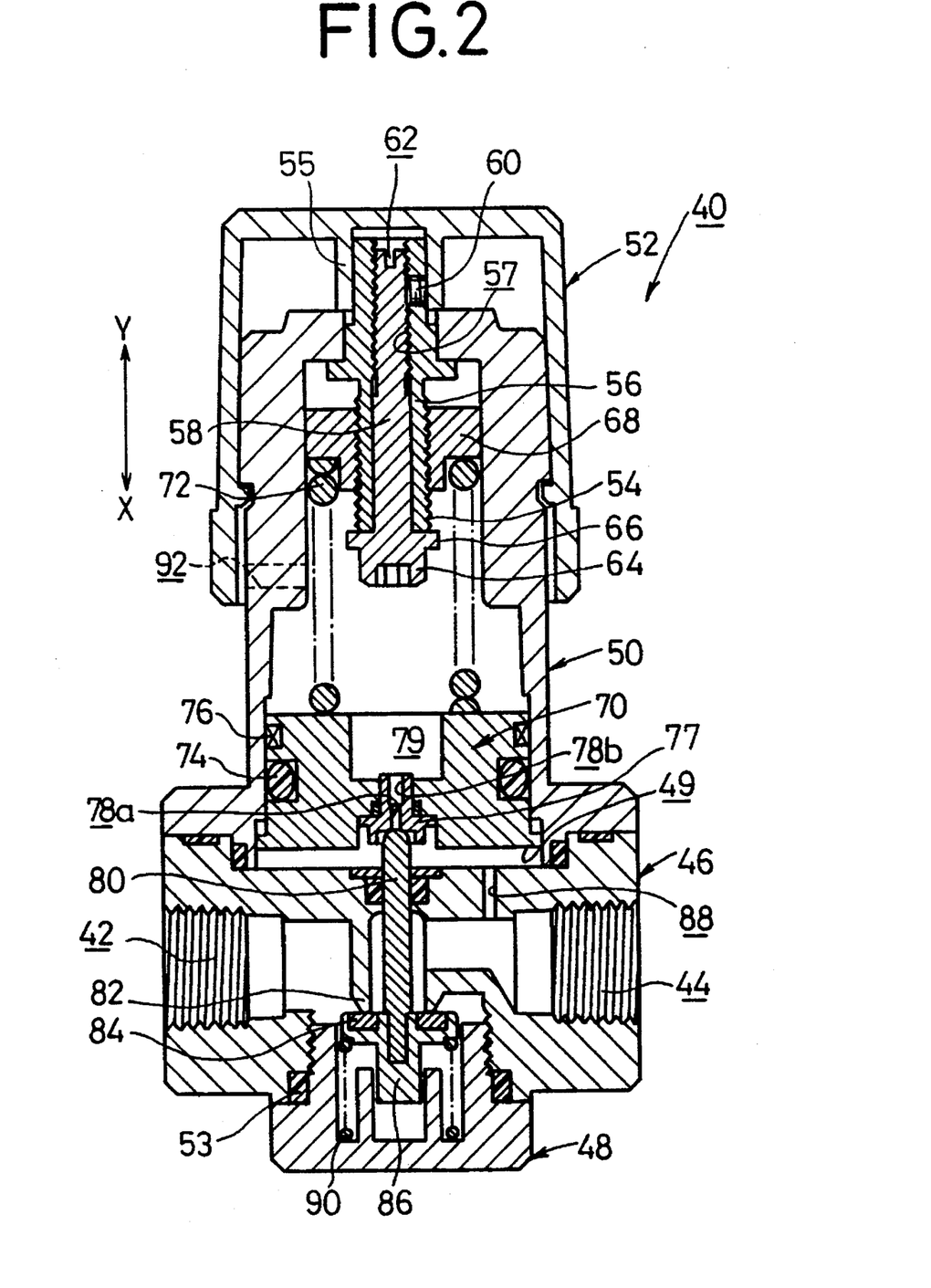
FIG. 2 is a vertical cross-sectional view showing a pressure reducing valve according to an embodiment of the present invention.

FIG. 2 shows a pressure reducing valve according to an embodiment of the present invention. The pressure reducing valve, generally designated at 40, is basically constituted with a body 46 in which an inlet port 42 and an outlet port 44 are defined, a bonnet 50 which is fastened to the body 46 and defines a piston chamber 49 together with the body 46, a plug 48 which is fitted to the bottom of the body 46 through a seal member 53, and a knob 52 which is substantially cylindrically shaped and put to an upper portion of the bonnet 50.

The knob 52 is provided with an internally projected portion 55 extending in an annular shape at its central portion. A screw member 56 (first screw member) with a thread portion 54 provided on its outer surface is secured to the projected portion 55. A through hole 57 is defined in the screw member 56 along its central axis, and a predetermined portion of an elongated screw member 58 (second screw member) is screwed into the through hole 57. The screw member 58 which is integrally formed, is fixed to the screw member 56 with a set screw 60. A groove 62 is defined at an upper end of the screw member 58, while a head 64 expanding radially outwardly is formed at its lower end. A flange 66 is formed between the screw member 56 and the head 64. The flange 66 serves as a stopper to a nut 68 which will be described below.

In the bonnet 50, there are provided the nut 68 which makes displacement in a direction of an arrow X or Y under an action of a screwing rotation of the screw member 56, and a spring 72 which is interposed between the nut 68 and a piston 70 and has its spring force to be controlled by rotating the knob 52 so as to press the piston 70 in the direction of the arrow X. An O-ring 74 for keeping the piston chamber 49 air-tight and a wearing ring 76 for sliding the piston 70 are fitted in annular grooves defined on the outer surface of the piston 70. A receiving member 77, in which first and second holes 78a, 78b having different diameters respectively are defined, is fitted to a central portion of the piston 70. Further, a chamber 79, which communicates with the second hole 78b, is defined at the center of the piston 70.

In the body 46, there are arranged a stem 80 which has its tip abutting against the inner wall of the first hole 78a of the piston 70, to close it, and a valve member 86 which is integrally connected to the stem 80 and has its seating portion 84 to be separated from an annular projection 82 so as to communicate the inlet port 42 with the outlet port 44. A passage 88 for communicating the outlet port 44 with the piston chamber 49 is defined between the outlet port 44 and the piston chamber 49. The valve member 86 is always pressed and held in the direction of the arrow Y by a valve spring 90 installed in an annular groove of the plug 48. A relief port opened to the atmosphere is indicated at 92.

The first and second holes 78a, 78b, the chamber 79 and the tip of the stem 80 serve as a relief valve for allowing the fluid to escape when the downstream pressure of the valve 40 becomes higher than a set pressure. Namely, the downstream pressure is introduced into the piston chamber 49 from the passage 88, and the piston 70 is lifted in the direction of the arrow Y, so that the tip of the stem 80 is separated from the first hole 78a. As a result, the downstream pressure is discharged to the atmosphere from the relief port 92 through the piston chamber 49.

The operation of the pressure reducing valve 40 according to the first embodiment of the present invention, basically constituted as described above, will next be explained.

First, an operator rotates the knob 52, and the screw member 56, together with the screw member 58, is rotated to displace the nut 68 in the direction of the arrow X opposing to the spring force of the spring 72. The nut 68 presses the spring 72 in the direction of the arrow X, and the piston 70 moves downwardly in the direction of the arrow X.

Figure 3:
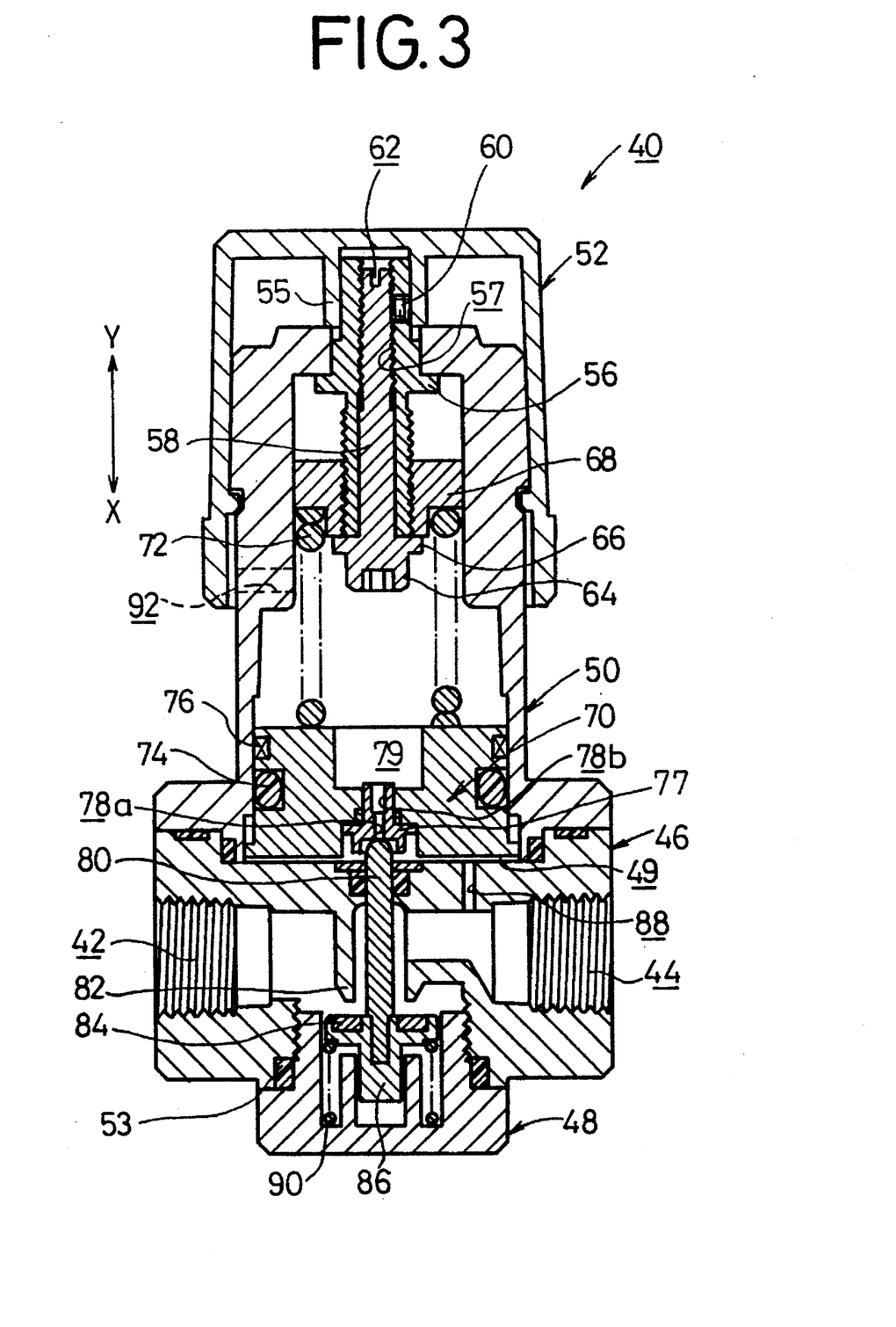
FIG. 3 is a vertical cross-sectional view showing a state in which a valve disk is apart from a valve seat and an inlet port communicates with an outlet port, in the pressure reducing valve shown in FIG. 2.

Thus, as shown in FIG. 3, the displacement of the nut 68 in the direction of the arrow X is limited by the flange 66, and the spring 72 keeps its resiliency to further contract.

Due to the displacement of the piston 70, together with the stem 80 abutting against the first hole 78a, pressed down in the direction of the arrow X, the valve member 86 makes displacement in the direction of the arrow X, and the seating portion 84 of the valve member 86 is separated from the annular projection 82, so that the inlet port 42 communicates with the outlet port 44.

The fluid introduced from the inlet port 42 into the piston chamber 49 through the passage 88 exerts an upward force onto the piston 70 to oppose to the spring force of the spring 72, and the distance between the seating portion 84 of the valve member 86 and the annular projection 82 is regulated to attain a desired set pressure in the outlet port 44. If the outlet pressure in the outlet port 44 becomes higher than the set pressure, the outlet pressure causes the piston 70 to be lifted in the direction of the arrow Y, and is discharged to the outside from the relief port 92 through the first and second holes 78a, 78b and the chamber 79.

Figure 4:
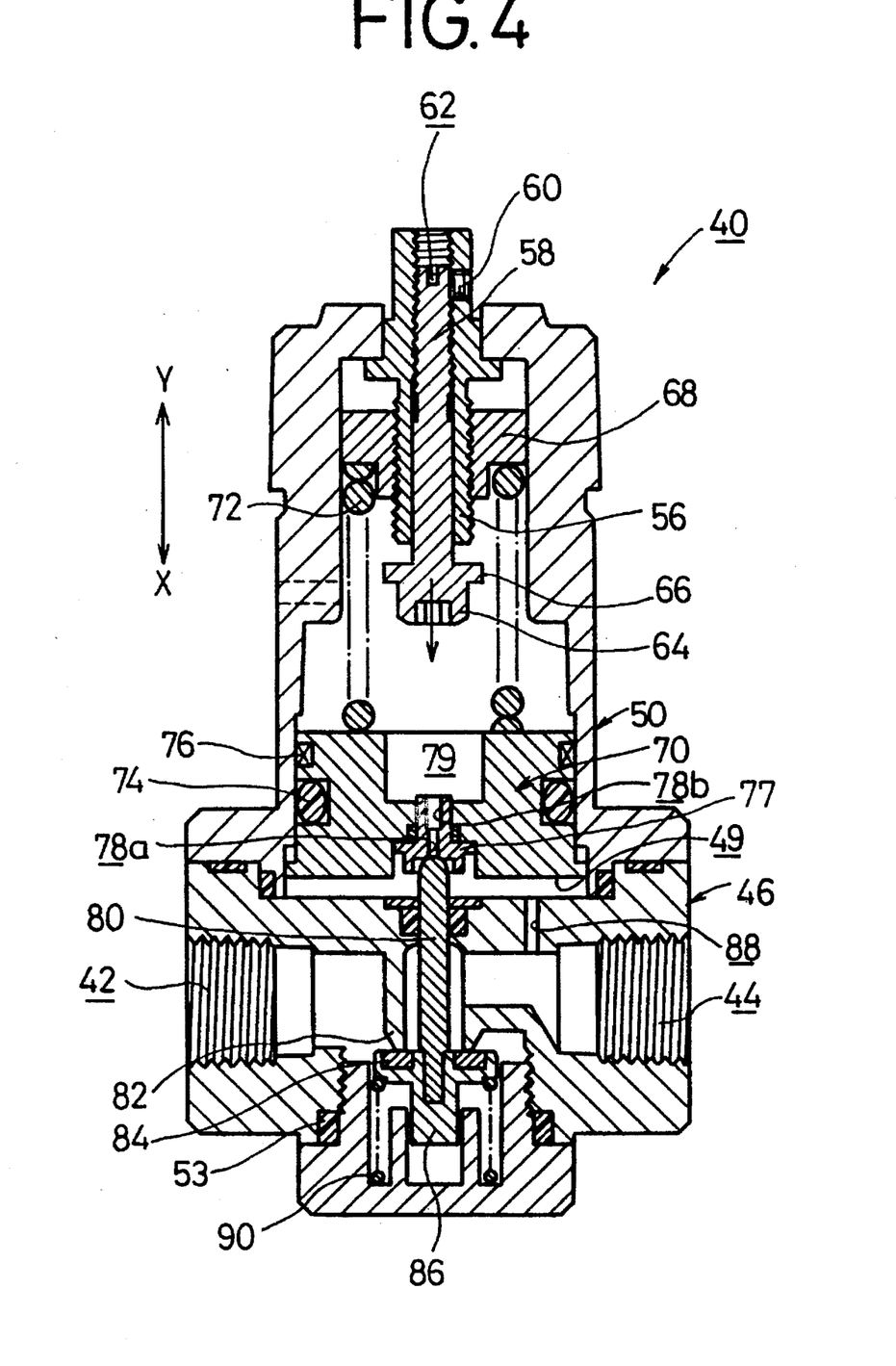
FIG. 4 is an explanatory view showing a state in which the position of a stopper is changed in the pressure reducing valve shown in FIG. 2.

When the operator needs to change the maximum set pressure, the knob 52 is removed from the upper portion of the bonnet 50, as shown in FIG. 4, to make the upper end of the screw member 58 accessible. Then, the set screw 60 is loosened, and the screw member 58 is rotated in a desired direction with a screwdriver applied to the groove 62, to cause the screw member 58 to be displaced with respect to the screw member 56 along its length.

Thus, when the flange 66 as a stopper to limit the displacement of the nut 68 is displaced in the direction of the arrow X, resulting in an increased contraction of the spring 72, a maximum set pressure for the outlet side can be increased.

Figure 5:
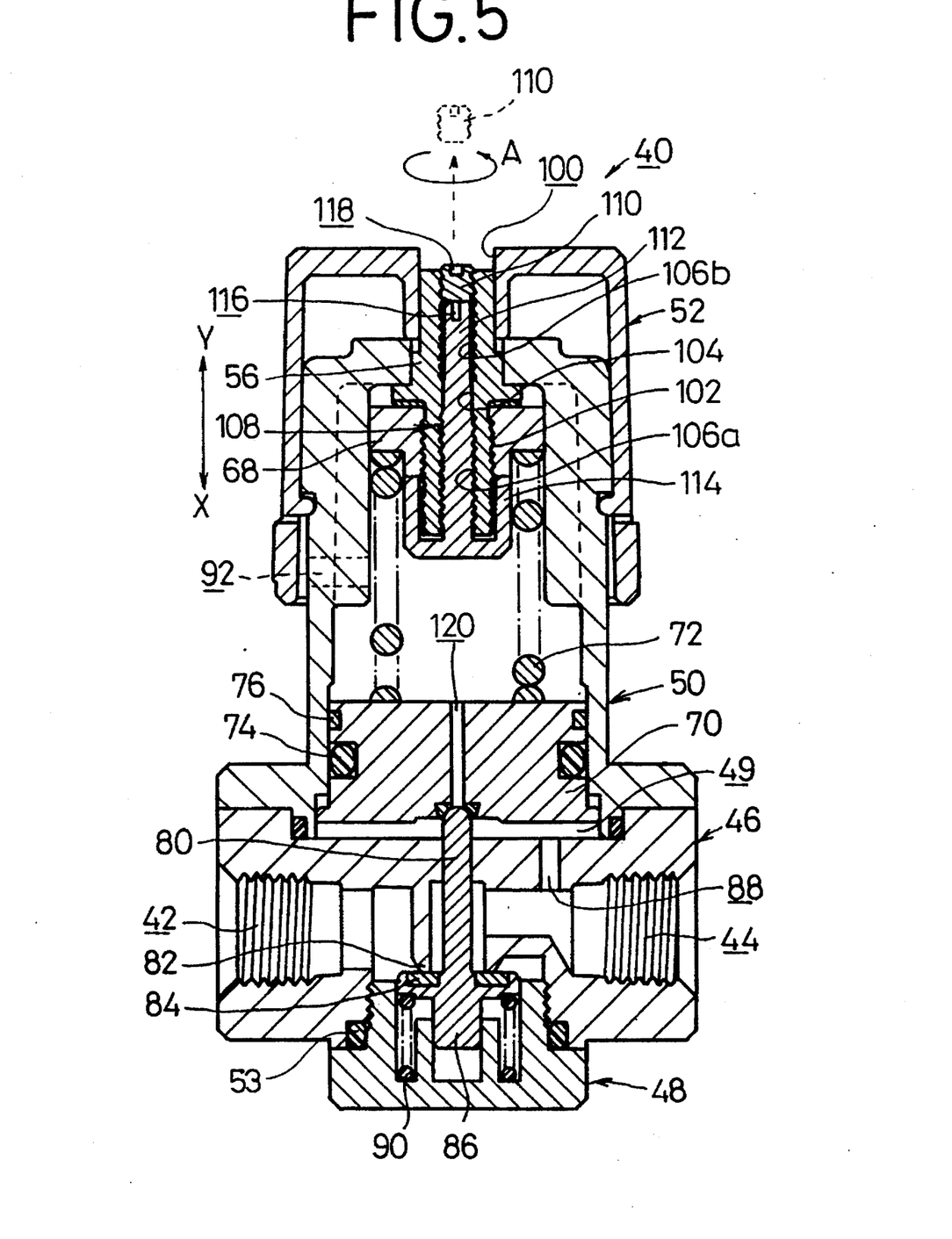
FIG. 5 is a vertical cross-sectional view showing a pressure reducing valve according to another embodiment of the present invention.
Figure 6:
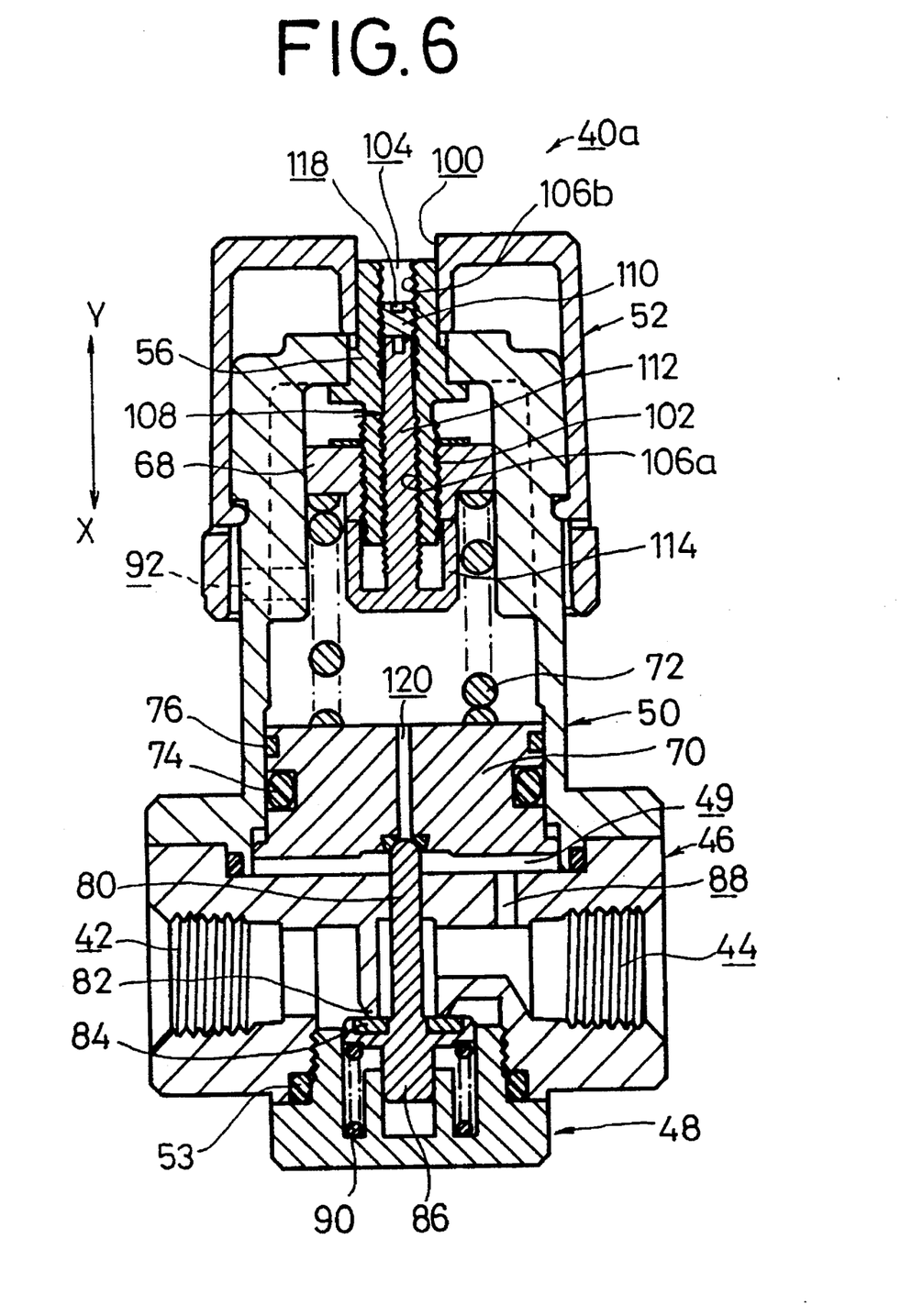
FIG. 6 is a vertical cross-sectional view of a state in which a nut of the pressure reducing valve shown in FIG. 5 is lowered.

A second embodiment of the present invention is shown in FIGS. 5 and 6. The second embodiment is partially different from the first embodiment in the structure of the piston 70, knob 52, screw member 56. The same elements are designated by the same reference numerals, detailed explanation of which is omitted.

In the second embodiment, a hole 100 is defined at the center of the knob 52. A screw member 56 with a left-handed thread portion 102 on the outer surface is secured to the hole 100. A through hole 104 is defined in the screw member 56 along its axis. A right-handed thread portion 106a and a left-handed thread portion 106b spaced apart from the portion 106a by a predetermined distance, are respectively formed on the inner wall surface of the through hole 104. A stopper 108 having a T-shaped vertical cross-section is screwed into the right-handed thread portion 106a, while a set screw 110 is screwed into the left-handed thread portion 106, respectively. The stopper 108 is integrally formed with a flange portion 114 and a shaft portion 112 having a length of threaded portion on the outer surface, in which the stopper 108 and the set screw 110 are arranged on an identical axis. The stopper 108 has a groove 116 formed at its upper end, and the flange portion 114 formed at its lower end which once projects radially outwardly and is subsequently folded in the direction of the arrow Y. The flange portion 114 serves as a stopper to the nut 68. A groove 118 is formed at the upper end of the set screw 110. In the present embodiment, the stopper 108 is fixed by the set screw 110, however, it is also acceptable that the shaft portion 112 of the stopper 108 is elongated to be exposed from the hole 100 of the knob 52, and the shaft portion 112 is fastened by a screw at the exposed portion. A through hole 120 is defined at the center of the piston 70 along its axis.

In the pressure reducing valve of the second embodiment, when the operator needs to change the maximum set pressure, the set screw 110 screwed in the left-handed thread portion 106*b* of the screw member 56 is removed by rotating the screw 56 in the direction shown by the arrow A (see a broken line in FIG. 5), so as to have the groove 116 of the stopper 108 accessible, and the stopper 108 movable with respect to the screw member 56. Then, the stopper 108 is rotated in a desired direction with a screwdriver applied to the groove 116, to cause the stopper 108 to be displaced with respect to the screw member 56 along its length (see FIG. 6).

Thus, when the flange portion 114 formed at the lower end of the stopper 108, as a stopper to limit the displacement of the nut 68, is displaced in the direction of the arrow X, resulting in an increased contraction of the spring 72, a maximum set pressure for the outlet side can be increased. Incidentally, even when the nut 68 abuts against the flange portion 114 of the stopper 108, the nut 68 and the stopper 108 are threaded in the opposite directions, so that the stopper 108 is prevented from rotation.

After the stopper 108 is placed at a desired position, the set screw 110 is again screwed into the left-handed thread portion 106*b* of the screw member 56, to fix the stopper 108, with the groove 118 rotated counterclockwise. Since the set screw 110 and the stopper 108 are threaded in the opposite directions with each other, the stopper 108 can be held without rotation when the set screw 110 abuts against the stopper 108.

With the arrangement described above, the difference between an actual maximum set pressure and a target maximum set pressure can be substantially eliminated, and thus the maximum pressure can be set in an enlarged setting range, as compared with the prior art pressure reducing valve.

Figure 7:
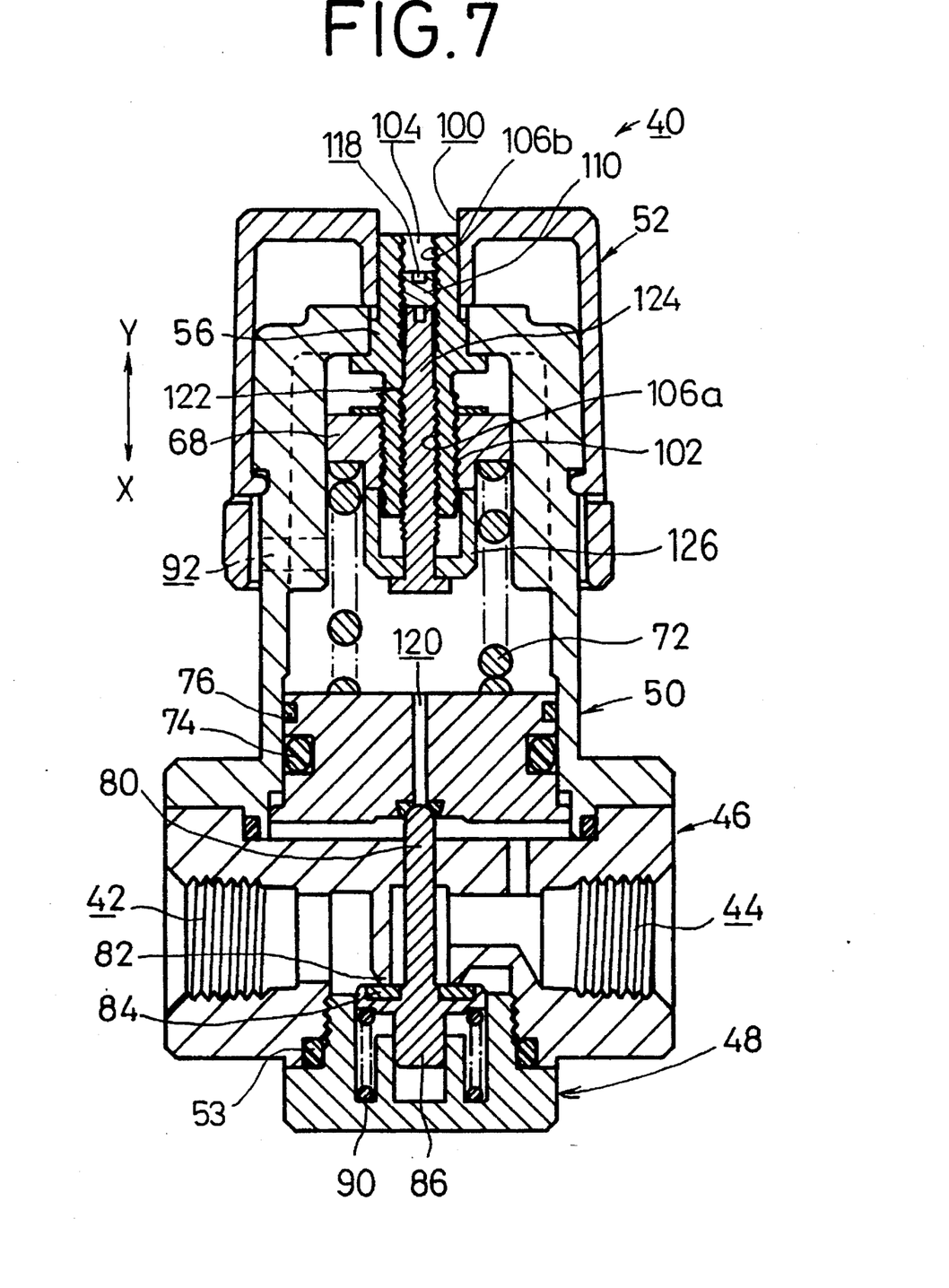
FIG. 7 is a vertical cross-sectional view showing a pressure reducing valve according to still another embodiment of the present invention.

In the second embodiment, the stopper 108 is integrally formed. However, as in a pressure reducing valve of a third embodiment shown in FIG. 7, such constitution is also acceptable that a stopper 122 and a flange member 126 are constituted separately, and the screw member 124 penetrates a flange member 126.

What is claimed is:

1. A pressure reducing valve having a spring for setting an outlet pressure and a knob for setting the outlet pressure by adjusting a spring force of said spring, the valve comprising:
    a first screw member secured to said knob so as to be rotated by said knob;
    a nut mounted on said first screw member for adjusting the spring force of said spring by a displacement of said nut along said first screw member produced by a rotation of said first screw member; and
    a second screw member screwed into a threaded hole defined in said first screw member along a central axis thereof, a first end portion of the second screw member comprising a stopper for limiting a maximum displacement of said nut along said first screw member, and a second end portion of the second screw member comprising adjusting means for permitting a displacement of said second screw member with respect to said first screw member so as to adjust a position of the stopper, wherein said adjusting means is operable from outside said pressure reducing valve.

2. A valve according to claim 1, wherein said second screw member has a groove at a head thereof for receiving a screwdriver applied thereto, to thereby make a displacement of said second screw member with respect to said first screw member.

3. A valve according to claim 1, further comprising a fixing means for fixing said second screw member to said first screw member.

4. A valve according to claim 3, wherein said stopper comprises a flange mounted on said second screw member, said flange having a folded portion extending from a perimeter thereof toward said nut.

5. A valve according to claim 3, wherein said fixing means comprises a set screw to be screwed into the threaded hole of the first screw member, said hole being provided with a first thread portion for receiving said second screw member therein, and a second thread portion for receiving said set screw therein, said first and second thread portions being threaded in opposite directions with respect to each other.

6. A valve according to claim 4, wherein said second screw member and said flange are integrally formed.

7. A valve according to claim 4, wherein said second screw member and said flange are separately formed and combined.

* * * * *